(12) United States Patent
Starz et al.

(10) Patent No.: US 8,361,921 B2
(45) Date of Patent: Jan. 29, 2013

(54) NOBLE METAL NANOPARTICLES, A PROCESS FOR PREPARING THESE AND THEIR USE

(75) Inventors: Karl-Anton Starz, Rodenbach (DE); Dan Goia, Branchburg, NJ (US); Joachim Koehler, Bruchköbel (DE); Volker Bänisch, Erlensee (DE)

(73) Assignee: Umicore AG & Co. KG, Hanau-Wolfgang (DE)

(*) Notice: Subject to any disclaimer, the term of this patent is extended or adjusted under 35 U.S.C. 154(b) by 66 days.

(21) Appl. No.: 13/309,677

(22) Filed: Dec. 2, 2011

(65) Prior Publication Data

US 2012/0077671 A1     Mar. 29, 2012

Related U.S. Application Data

(60) Continuation of application No. 11/405,913, filed on Apr. 17, 2006, now Pat. No. 8,071,259, which is a division of application No. 09/910,959, filed on Jul. 24, 2001, now abandoned.

(30) Foreign Application Priority Data

Jul. 29, 2000 (DE) .................................. 100 37 071

(51) Int. Cl.
*H01M 4/88* (2006.01)
*H01M 4/02* (2006.01)
*H01M 4/36* (2006.01)
*B01J 23/40* (2006.01)

(52) U.S. Cl. .................. 502/101; 429/524; 502/185

(58) Field of Classification Search .................. 502/101, 502/185; 429/524
See application file for complete search history.

(56) References Cited

U.S. PATENT DOCUMENTS

| 4,421,617 A | * | 12/1983 | Gratzel et al. | 204/157.52 |
| 5,421,989 A | * | 6/1995 | Stamp et al. | 205/166 |
| 5,489,563 A | * | 2/1996 | Brand et al. | 502/185 |

* cited by examiner

*Primary Examiner* — Helen O Conley
(74) *Attorney, Agent, or Firm* — Levin Santalone LLP; John Santalone

(57) ABSTRACT

Nanoparticles which contain noble metals alone or noble metals in combination with base metals. The nanoparticles are embedded in an aqueous solution of a temporary stabilizer based on a polysaccharide.

8 Claims, 2 Drawing Sheets

NOBLE METAL NANOPARTICLES, A PROCESS FOR PREPARING THESE AND THEIR USE

This application is a continuation application of U.S. patent application Ser. No. 11/405,913, filed Apr. 17, 2006, now U.S. Pat. No. 8,071,259, issued Dec. 6, 2011, which in turn is a divisional application of U.S. patent application Ser. No. 09/910,959, filed Jul. 24, 2001, now abandoned; the disclosures of which are hereby incorporated by reference into the present disclosure.

INTRODUCTION AND BACKGROUND

The present invention provides noble metal-containing nanoparticles for producing membrane electrode assemblies (MEAs) for fuel cells, in particular for low temperature fuel cells, for example polymer electrolyte membrane fuel cells (PEM fuel cells) and direct methanol fuel cells (DMFC). New types of colloidal solutions which contain the noble metal alone or in association with other metals are described, wherein the metals are in the form of nanoparticles embedded in a temporary stabilizer. The nanoparticles are used to produce electrocatalysts and catalysed components for fuel cells. Using these nanoparticles, catalyzed ionomer membranes, catalyzed gas diffusion electrodes (so-called "backings") and membrane electrode assemblies can be produced.

Fuel cells convert a fuel and an oxidizing agent which are spatially separated from each other at two electrodes into electricity, heat and water. Hydrogen or a hydrogen-rich gas may be used as the fuel, and oxygen or air as the oxidizing agent. The process of energy conversion in the fuel cell is characterized by a particularly high efficiency. For this reason, fuel cells in combination with electric motors are becoming more and more important as an alternative to traditional internal combustion engines. The PEM fuel cell is suitable for use as an energy converter in motor vehicles because of its compact structure, its power density and its high efficiency.

The PEM fuel cell consists of a stacked arrangement ("stack") of membrane electrode assemblies (MEAs), between which are arranged bipolar plates for supplying gas and conducting electricity. A membrane electrode assembly consists of a solid polymer electrolyte membrane, both sides of which are provided with reaction layers which contain catalysts. One of the reaction layers is designed as an anode for the oxidation of hydrogen and the second reaction layer is designed as a cathode for the reduction of oxygen. On these reaction layers are mounted so-called gas distributor structures or gas diffusion layers made of carbon fibre paper, carbon fibre woven fabric or carbon fleece, which facilitate good access by the reaction gases to the electrodes and effective removal of the cell current. The anode and cathode contain so-called electrocatalysts which catalytically support the particular reaction (oxidation of hydrogen at the anode and reduction of oxygen at the cathode). Metals from the platinum group in the periodic system of elements are preferably used as the catalytically active components. In the majority of cases, so-called supported catalysts, in which the catalytically active platinum group metal has been applied in highly dispersed form to the surface of a conductive support material, are used.

The polymer electrolyte membrane consists of proton-conducting polymer materials. These materials are also called ionomers for short in the following. A tetrafluorethylene/fluorovinylether copolymer with acid functions, in particular sulfonic acid groups, is preferably used. Such materials are sold, for example, under the tradenames Nafion® (E.I. DuPont) or Flemion® (Asahi Glass Co.). However, other, in particular fluorine-free, ionomer materials such as sulfonated polyetherketones or polyarylketones or polybenzimidazoles but also ceramic materials can be used.

The performance data for a fuel cell depends critically on the quality of the catalyst layers applied to the polymer electrolyte membrane. These layers usually consist of an ionomer and a finely divided electrocatalyst dispersed therein. Together with the polymer electrolyte membrane, so-called three-phase interfaces are formed in these layers, wherein the ionomer is in direct contact with the electrocatalyst and the gases (hydrogen at the anode, air at the cathode) introduced to the catalyst particles via the pore system.

To prepare the catalyst layers, ionomer, electrocatalyst and optionally other additives are generally blended to form an ink or a paste. To produce the catalyst layer, the ink is applied by brushing, rolling, spraying, doctor blading or printing either to the gas diffusion layer (e.g. carbon fleece or carbon fibre paper) or directly to the polymer membrane, dried and optionally subjected to a secondary treatment. In the case of coating the ionomer membrane with a catalyst layer, the non-catalyzed gas diffusion layers are then mounted on the membrane on the anode and cathode faces and a membrane electrode assembly is then obtained. Alternatively, the catalyst layers may also be applied to the gas diffusion layers. These gas diffusion electrodes (gas diffusion layers plus catalyst layers) are then laid on the two faces of the ionomer membrane and laminated with this, wherein a membrane electrode assembly is also obtained. The prior art in this area is described in patent documents U.S. Pat. Nos. 5,861,222, 5,211,984 and 4,876,115.

The present invention provides noble metal-containing nanoparticles which can be used for the production of catalyzed components and membrane electrode assemblies for low temperature fuel cells (PEMFC, DMFC, AFC or PAFC). The object of the invention are new types of preparations, or colloidal solutions, of noble metal-containing nanoparticles which are embedded in a suitable temporary stabilizer.

Colloidal nanoparticle solutions have been known for a long time. For example, they are used to produce noble metal supported catalysts. Thus, U.S. Pat. No. 3,992,512 describes a process in which colloidal platinum oxide nanoparticles are prepared by decomposing platinum sulfite acid, fixing these to a supporting carbon black and then reducing to platinum. The process is complicated and expensive and provides only electrocatalysts which are contaminated with sulfur due to using sulfur-containing precursor compounds for the platinum. Stabilizers are not used.

DE 197 54 304 A1 describes platinum-containing nanoparticles which are embedded in a polymeric betaine. Polymeric carbobetaine, phosphobetaine and sulfobetaine, which are built up from a non-branched polymethylene main chain and side chains with different types of betaine groups having degrees of polymerization of 50 to 10,000, are described. The method for decomposing these stabilizers is not described. It has been shown that these stabilizers adhere firmly to the noble metal surface, due to their long polymethylene main chains, and thus contaminate the catalytically active catalyst surfaces. For this reason, these nanoparticles are not very suitable as catalytically active species for membrane electrode assemblies in fuel cells. Nothing is reported about the further processing of these in order to produce catalyzed systems (catalysed ionomer membranes, gas diffusion electrodes, etc.).

Furthermore, DE 44 43 705 A1 discloses noble metal colloids which are stabilized with surfactants (such as, for example, fatty alcohol polyglycol ethers or amphiphilic betaines) and can be used for preparing supported electrocatalysts. After attaching these noble metal colloids to the support material, aftertreatment is required in order to remove the surfactants used for stabilizing purposes. During this aftertreatment (generally thermal pyrolysis at temperatures above 400° C.) the colloid particles sinter so that coarse crystallites are produced.

Furthermore, DE 197 45 904 A1 describes a polymer-stabilized metal colloid solution which contains a cation exchange polymer for stabilizing purposes. Here, the noble metal nanoparticles are precipitated in the presence of an ionomer solution (e.g. Nafion®) and isolated as a dry powder. Investigations by the inventors of the present invention have shown that this process does not lead to stable liquid colloid preparations because the ionomer has no surfactant properties and in addition is itself present as particles in the size range 5 to 20 nm (see also X. Cheng et al., J. Power Sources 79 (1999) 75-81). In addition, our work has shown that this process has considerable disadvantages because it provides nanoparticles which are heavily contaminated with foreign ions such as, for example, chloride or sodium. The presence of chloride in particular leads to corrosion and reduced resistance to ageing of the catalyst components prepared using this metal colloid preparation.

Therefore it is the object of the present invention to provide noble metal-containing nanoparticles which form stable solutions over a long time due to the use of a suitable, temporary, stabilizer and contain only marginal amounts of impurities (halogen ions, alkali metal ions, borate, etc.), which are insignificant for use in fuel cells. They are intended to be used directly for catalyzing ionomer membranes and gas diffusion layers for PEM fuel cells, which means that the temporary stabilizer (or protective colloid) has to be completely removable by means of a gentle process without damaging the polymer electrolyte membrane. Furthermore, the nanoparticles are intended to be capable of being prepared in aqueous medium without the addition of organic solvents.

SUMMARY OF THE INVENTION

This object is achieved, according to the invention, by nanoparticles which contain the noble metals only or noble metals in combination with base metals and are characterised in that they are embedded in an aqueous solution of a temporary stabilizer based on a polysaccharide.

According to the invention, polysaccharides are used to stabilize the nanoparticles. Suitable polysaccharides are described in Ullmanns Enzyklopädie der technischen Chemie, 4th edition, vol. 19, p. 233 et seq. Polysaccharides are water soluble, highly polymer carbohydrate compounds, which consist of monosaccharide units linked together by a so-called glycosidic bond. When forming this bond, the anomeric hydroxyl group of the monosaccharide reversibly condenses with the hydroxy group of another monosaccharide to form a disaccharide, oligo- or finally a polysaccharide molecule. A single polysaccharide molecule can contain up to several ten thousands of various monosaccharide units. Polysaccharides, which are composed of various types of monosaccharide units are called heteropolysaccharides, those which contain only one monosaccharide type are called homopolysaccharides. The polysaccharides differ in their molecular weight, their composition and, most important, in their water solubility.

It was discovered that the polysaccharides suitable for use in the present invention must be highly water soluble. Most common polysaccharides and gums cannot be dissolved in water at concentrations higher than about 5 wt. % because of their very high viscosities and their gelling behaviour. The preferred polysaccharides exhibit a water solubility of about 5 to 40 wt. % while still maintaining a low viscosity solution. The preferred polysaccharides are heteropolysaccharides such as gum arabic, xanthan gum, tragacanth gum or mixtures thereof.

Furthermore it was found that the water based solution of the polysaccharide has to be preferably in the pH neutral form. A pH range of 5 to 8, preferably 5.5 to 7.5 and most preferably 6 to 7 is required to ensure stability of the polysaccharide. At a lower, more acidic pH, as well as at higher alkaline pH values, the glycosidic bonds of the polysaccharide are broken up and the macromolecule is destroyed. This effect is used in turn to remove traces of the stabilizer after the colloidal noble metal particles have been deposited on the suitable substrate material (ionomer membranes, gas diffusion electrodes or carbon black supports) as described further below in this invention.

When properly selected, the stabilizers mentioned are able to keep the colloidal preparation of nanoparticles, even in high concentrations, stable for a long time. For this purpose, it has proven advantageous to adjust the ratio by weight of nanoparticles to stabilisers to a value between 10:1 and 1:10, preferably between 5:1 and 1:5.

The temporary stabilizers used have to be capable of being removed effectively. Particularly important here is an easy decomposition (i.e. breaking down of the main chain in the polymer into low molecular weight fragments). During the course of trials, it has been shown that the polysaccharides are extremely suitable as temporary stabilisers. As described previously, in these compounds, the glycosidic bonds between the individual monosaccharides or sugar monomers break readily when treated with acids or alkalis. They depolymerize and break down into low molecular weight constituents. This decomposition process also takes place during pyrolysis at temperatures up to 250° C. The low molecular weight fragments can be readily removed, for example by washing out.

Nanoparticles according to the invention may contain one or more noble metals and optionally in addition at least one base metal. Nanoparticles according to the invention preferably contain at least one noble metal from the group platinum, palladium, rhodium, iridium, ruthenium, osmium, gold and silver. Suitable base metals are iron, cobalt, nickel, copper, titanium, vanadium, chromium, manganese, molybdenum, tungsten and rhenium. The particle size of the nanoparticles is between 0.1 and 100, preferably between 1 and 20 and in particular between 1 and 5 nm. The particle size can be determined by means of transmission electron microscopy (TEM).

The concentration of noble metal nanoparticles in the aqueous colloid solution is 0.01 to 500 g/l (0.001 to 50 wt%), typically 0.1 to 200 g/l (0.01 to 20 wt. %).

Nanoparticles according to the invention can be obtained by reducing precursor compounds of the desired noble metals and optionally base metals with a total chlorine concentration of less than 500 ppm in an aqueous solution in the presence of the stabiliser, using a reducing agent.

Suitable reducing agents for the preparation according to the invention are those which decompose to produce no residues or which leave behind no problematic ionic or organic impurities during the reduction process. Examples of these are hydrogen, hydrazine, formaldehyde, or else lower aliphatic alcohols such as ethanol or isopropanol which decompose to give gaseous constituents due to the reduction reaction. The reducing agent is added directly to the reaction solution, with stirring, wherein temperatures of up to 95° C. are optionally used. After completion of the reduction the colloidal solution of the nanoparticles in principle does not contain any more reducing agents. Surplus reducing agents are destroyed due to treatment at elevated temperatures of up to 95° C.

The following halogen-free, or low-halogen, compounds are used, for example, as noble metal precursor compounds for preparing the nanoparticles:

for Pt: hexahydroxoplatinic (IV) acid, ethylammonium hexahydroxoplatinate, tetraammineplatinum (II) nitrate, platinum (IV) nitrate, tetraammineplatinum (II) hydroxide solution for Pd: tetraamminepalladium(II) nitrate, palladium(II) nitrate, palladium(II) sulfate hydrate for Ru: trinitratonitrosylruthenium (II), ruthenium (III) oxalate hydrate etc.

for Rh: rhodium (III) nitrate hydrate, rhodium (III) sulfate solution etc.

Corresponding compounds may also be used for the noble metals Au, Ag, Ir and Os. The precursor compounds used for the base metals mentioned are chlorine-free salts of the base metals, preferably nitrate compounds.

In general, the total chlorine content of the precursor compounds used should be less than 500 ppm. Determination of the total chlorine content includes both the free and also the bonded chlorine and is performed, for example, by ion chromatography (IC), in aqueous solution, after working up the substance in a suitable manner.

The total chlorine content of the noble metal solution according to the invention is typically less than 100 ppm, preferably less than 50 ppm.

Nanoparticles according to the invention may be used to prepare supported electrocatalysts. A particular advantage of the nanoparticles, however, is that they can also be used directly, that means without a support, to prepare catalyst layers for ionomer membranes and gas diffusion layers and also to impregnate the ionomer membranes themselves.

In the following, some of these types of use are described in more detail.

For the preparation of supported electrocatalysts, the noble metal nanoparticles are deposited onto a suitable carbon black material. Several methods (for example impregnation, soaking or incipient wetness type methods and others) can be used for this process. Hereby, electrocatalysts exhibiting a very high noble metal dispersion (i.e. noble metal surface area) are obtained, even at very high noble metal loading of the carbon black support. Investigations of the present inventors have shown, that electrocatalysts with a noble metal loading of up to 80 wt. % on carbon black can be prepared with particle sizes in the range of 2 to 5 nanometer. After depositing the nanoparticles on the carbon black support, the stabilizer can be removed under mild conditions, that is with acidic or alkaline hydrolysis or by thermal decomposition at temperatures of up to 250° C.

Direct use of the nanoparticles for catalysing the various components in a fuel cell is enabled in that the protective colloid, or temporary stabilizer, decomposes under relatively mild conditions and can be washed out so that damage to the components in the fuel cell does not occur. This produces a considerable simplification in and reduction in costs of the production process for membrane electrode assemblies. In addition, the process has the advantage that the high surface area and dispersion of the nanoparticles is retained and is not distorted by high temperature tempering processes. This leads to very good performance by the membrane electrode assemblies prepared in this way so that the platinum loading can be kept low.

In the case of coating an ionomer membrane, the preparation with the nanoparticles, optionally mixed with other additives such as, for example, dissolved ionomer, carbon black or further electrocatalysts, is applied to the membrane in a spray process, by brushing or immersing or by means of screen printing. After coating, the temporary stabilizer is decomposed by treating with acid or alkali and it is then washed out. Dissolved ionomer is obtainable in aqueous solution with low molecular weight aliphatic alcohols (Fluka, Buchs; Aldrich, Steinheim). Aqueous solutions of the ionomer in higher concentrations (10 wt. % and 20 wt. %) can be prepared therefrom.

Ionomer membranes and also the ionomer contained in the catalyst layers can be used in an acidic proton-conducting $H^+$ form or, after exchanging the protons for monovalent ions such as, for example, $Na^+$ and $K^+$, in a non-acidic $Na^+$ or $K^+$ form for preparing membrane electrode assemblies. The non-acidic form of polymer membranes is usually more stable towards thermal stress than the acidic form and is therefore preferably used. Before using the membrane electrode assembly, however, the polymer electrolyte has first to be returned to its acidic, proton-conducting form. This is achieved by so-called reprotonation. Reprotonation is performed by treating the membrane electrode assembly in sulfuric acid.

Reprotonation with sulfuric acid can therefore be combined in a simple manner with decomposition of the temporary stabilizer. This simplifies the production process for membrane electrode assemblies. The ionomer membrane catalyzed in this way is then completed with 2 gas diffusion electrodes to give a 5-layered membrane electrode assembly.

As an alternative to coating the ionomer membrane, the gas diffusion layers may also be coated with the catalytically active component. For this purpose, the colloidal preparation of nanoparticles, optionally with the additives mentioned above, is applied to a gas diffusion layer (gas distribution structure or "backing" consisting of carbon fibre paper) using an appropriate method. The stabilizer is then removed by a tempering process at temperatures below 250° C. and the catalysed electrode, as the anode and cathode, are further laminated with an ionomer membrane to give a 5-layered membrane electrode assembly.

Furthermore, the colloidal noble metal nanoparticles may also be processed to give a catalyst ink. Suitable catalyst inks are described, for example, in patent specification U.S. Pat. No. 5,861,222 in the name of the applicant, wherein the supported catalysts used there may be replaced entirely or partly by noble metal nanoparticles according to the invention.

The colloidal solution of noble metal nanoparticles is also suitable for precatalyzing ionomer membranes by impregnating the ionomer membrane in the solution. In further steps, a catalyst ink is then applied to the precatalyzed ionomer membrane, as described in the US patent specification mentioned above. However, the precatalyzed ionomer membrane may also be assembled, together with catalysed gas diffusion electrodes on the cathode and anode faces, and laminated to produce a 5-layered membrane electrode assembly.

In a further type of use, a thin layer of the colloidal noble metal particles according to the invention is also applied to a catalysed gas diffusion electrode, for example by spraying or brushing. The multi-catalyzed gas diffusion electrodes are then combined with the ionomer membrane in a sandwich structure and optionally laminated.

In addition, combinations of the types of use described above are possible. All these methods for catalysing, due to the use of the colloidal noble metal particles according to the invention, lead to high catalytic activity and electrical performance in the membrane electrode assembly, and in the PEM fuel cell.

BRIEF DESCRIPTION OF DRAWINGS

The present invention will be further understood with reference to the accompanying drawing, wherein.

DETAILED DESCRIPTION OF INVENTION

Directly catalyzing the various components of a PEM fuel cell with noble metal nanoparticles is accomplished by applying the aqueous solution of the stabilized nanoparticles with no further additives to the components in question by a spray process, by brushing or immersing or by means of screen printing. After coating, the temporary stabilizer is decomposed by treating with acid or alkali (depending on the type of stabilizer) and is then washed out.

Figure 1:
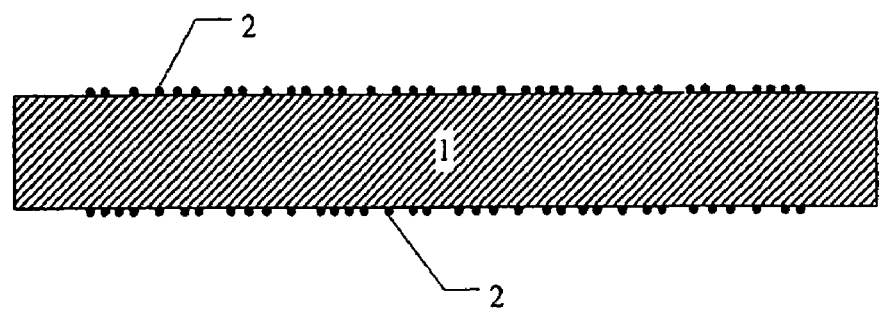
FIG. 1 is a schematic cross section of a polymer electrolyte membrane directly catalyzed with nanoparticles according to the invention.

FIG. 1 visualises such a coating on the opposing surfaces of a polymer electrolyte membrane (1). The noble metal nanoparticles (2) are directly applied to the surfaces of the ionomer by a process as described above.

Figure 2:
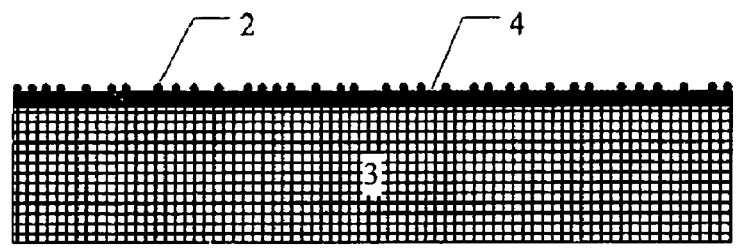
FIG. 2 is a schematic cross section of an electrode backing directly catalyzed with nanoparticles according to the invention.

FIG. 2 shows a similar coating as in FIG. 1 on an electrode backing consisting of a hydrophobic gas diffusion layer (3) with a carbon black micro layer (4) on one of its surfaces. A micro layer consists of a mixture of a hydrophobic polymer and carbon black. The micro layer has a microporosity and serves as an intermediate layer between the gas diffusion layer and the catalyst layer of a MEA to improve the electronic connection between both. In FIG. 2 the noble metal nanoparticles (2) are directly deposited onto the micro layer. Since an electrode backing can withstand much higher temperatures than the polymer membrane (340° C. instead of only 150° C.) the temporary stabilizer can be decomposed in this case thermally by heating the coated electrode backing up to a temperature of 250° C.

Figure 3:
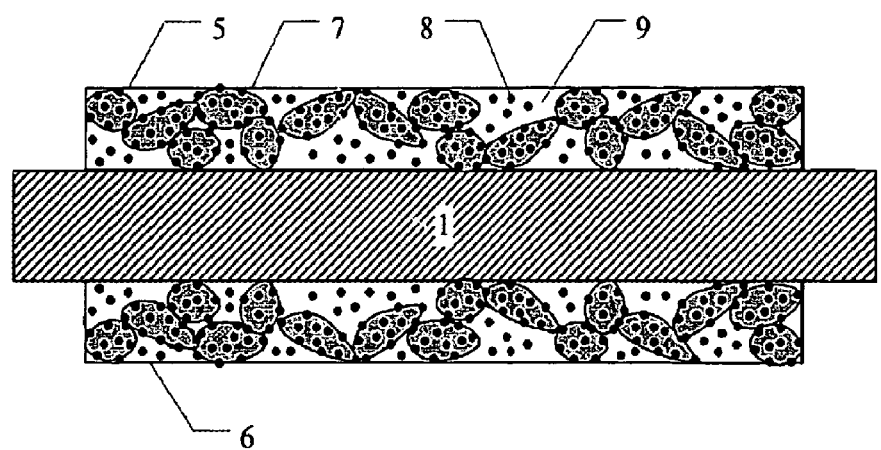
FIG. 3 is a schematic cross section of an membrane electrode assembly (MEA) with catalyst layers comprising a supported electrocatalyst and nanoparticles according to the invention.

FIG. 3 shows the structure of a polymer electrolyte membrane (1) coated with two catalyst layers (5) and (6). The catalyst layers comprise a supported electrocatalyst (7) and unsupported nanoparticles (8). The supported electrocatalyst and the unsupported nanoparticles are both dispersed in a matrix of a ionomer (9). The catalyst layers (5) and (6) may be the same or different. In the final fuel cell one of these catalyst layers functions as the anode and the other as the cathode of the fuel cell.

Figure 4:
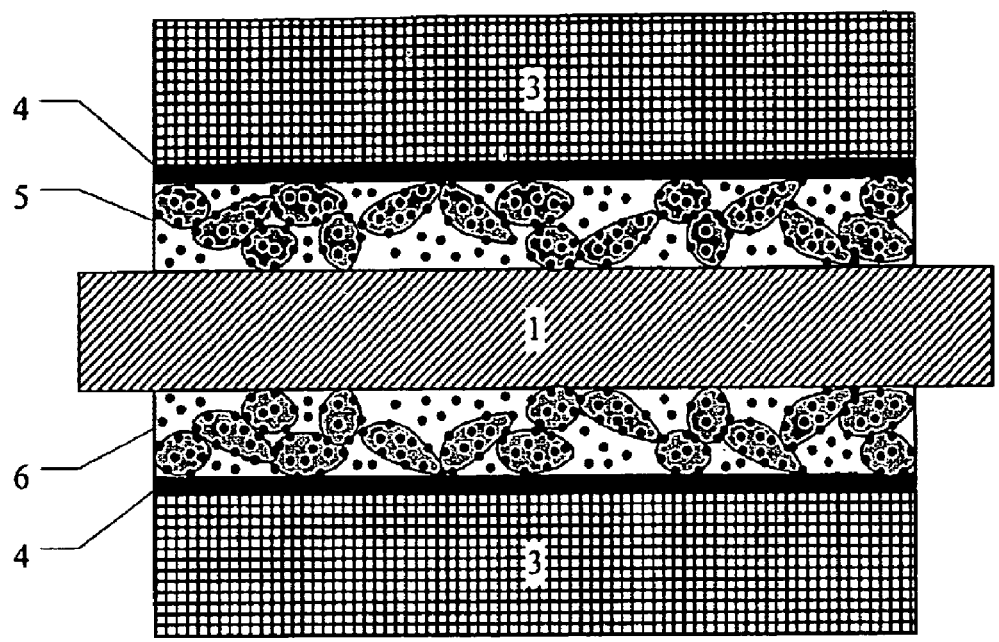
FIG. 4 is a schematic cross section of a 5-layered membrane electrode assembly according to the invention.

FIG. 4 visualizes a polymer electrolyte fuel cell comprising the membrane electrode assembly of FIG. 3 complemented by two electrode backings consisting of a hydrophobic gas diffusion layer (3) and a micro layer (4). Taking the electrode backings as one layer, the structure of FIG. 4 can be viewed as a 5-layered membrane electrode assembly.

The invention is explained in more detail in the following by the use of a few examples. In the examples, membrane electrode assemblies were prepared by using nanoparticles according to the invention and their electrochemical performance data were characterized.

For this purpose, the membrane electrode assemblies were processed to give PEM single cells and their characteristics (change in voltage/current density plot) were measured at a pressure of about 1 bar (abs.) when operated with hydrogen/air or with reformate/air. The size of each cell was 50 $cm^2$, the cell temperature was 75° C. From the characteristic plots, the cell voltage obtained at a current density of 500 $mA/cm^2$ was recorded as a measure for the electrocatalytic performance of the cell.

EXAMPLE 1 a) Preparing Pt Nanoparticles 11.1 g of a solution of bis(ethanolammonium) hexahydroxoplatinate (Pt content 9 wt. %; total chlorine content <100 ppm; from $dmc^2$, Hanau) were added dropwise to 1.5 l of fully deionized water in which 1.0 g of gum arabic (Merck) had previously been dissolved. Then, 1 l of ethanol was added with stirring and the resulting mixture was heated, wherein the mixture turned black. The solution was kept under reflux for one hour at 85° C. and then concentrated to a volume of 100 ml by evaporation. The colloidal solution prepared in this way had a pH value of 5.9 and contained 10 g Pt/l (1 wt. % Pt) and 10 g/l (1 wt. %) of the stabilizer gum arabic. The ratio of Pt nanoparticles to stabilizer was thus 1:1. The total chlorine content of the solution was less than 10 ppm. The average size of the Pt particles was determined using TEM (transmission electron microscopy) and was 2 nm.

b) Catalyzing Ionomer Membranes 5.6 g of the colloidal solution (Pt content 1 wt. %) were dispersed with 0.4 g of an aqueous solution of Nafion (10 wt. % in water) and 0.1 g of carbon black (type: Vulcan XC-72, from Cabot) and the resulting ink was applied in a spray process to the front and rear faces of a Nafion membrane (type: Nafion 112, thickness 50 μm, from DuPont). Then drying was performed at temperatures of 80° C. in a circulating air oven. The total Pt loading on the front and rear faces of the membrane was 0.2 mg $Pt/cm^2$. After drying, the catalyzed membrane was treated for 30 min in a sulfuric acid bath (0.5 normal, pH=0.3) and then washed with water. After that, it was placed between two non-catalyzed gas diffusion layers and incorporated into a PEM single cell.

When operating with hydrogen/air (pressureless operation, about 1 bar), a cell voltage of 600 mV was produced with a current density of 500 $mA/cm^2$.

c) Catalyzing Gas Diffusion Electrodes 0.4 g of an aqueous solution of Nafion (10% in water) were added to 5.6 g of the colloidal solution (concentration: 1 wt. % Pt) and the mixture was applied in a spray process to two gas diffusion layers (type: Standard ELAT, ETEK, Natick, USA) provided, in a known manner, with a carbon black micro layer. The Pt loading on the anode electrode was 0.1 $mg/cm^2$, that on the cathode electrode was 0.15 $mg/cm^2$. Then drying was performed at temperatures of 80° C. in a circulating air oven and a tempering process was performed under nitrogen at 250° C. The electrodes prepared in this way were combined with an non-catalyzed membrane to give a 5-layered membrane electrode assembly which had a total Pt loading of 0.25 mg $Pt/cm^2$. In a PEM single cell, very good performance values were obtained when operating with hydrogen/air (pressureless operation at about 1 bar; cell voltage: 600 mV with a current density of 500 mA/cm$^2$).

EXAMPLE 2 a) Preparation of Pt/Ru Nanoparticles 7.28 g of a solution of bis(ethanolammonium) hexahydroxoplatinate (Pt content 9 wt. %; total chlorine content <100 ppm; from dmc$^2$, Hanau) and 2.265 g of a solution of ruthenium nitrosylnitrate (Ru content 15 wt. %, total chlorine content <200 ppm; from dmc$^2$, Hanau) were added dropwise to 1.5 l of fully deionized water, in which 1.0 g of gum arabic, (Merck) had been dissolved. Then 1 l of ethanol was added with stirring and the resulting mixture was heated, wherein it turned black. The solution was held under reflux for one hour at 85° C. and then concentrated by evaporation to a volume of 100 ml. The colloidal solution obtained in this way had a pH value of 5.7 and contained 10 g PtRu/l (1 wt. % PtRu, atomic ratio 1:1) and 10 g/l (1 wt. %) of the stabiliser gum arabic. The ratio of PtRu nanoparticles to stabilizer was thus 1:1. The total chlorine content of the solution was less than 50 ppm. The average size of the PtRu particles was determined by TEM and was 2.5 nm.

b) Catalyzing an Ionomer Membrane 5.6 g of the colloidal solution (concentration: 1 wt. % PtRu) were dispersed with 0.4 g of an aqueous solution of Nafion (10% in water) and 0.1 g of carbon black (type: Vulcan XC-72, from Cabot) and the resulting ink was applied in a spray process to the anode face of a Nafion membrane (type: Nafion 112, thickness 50 µm, from DuPont). Then drying was performed at temperatures of 80° C. in a circulating air oven. The Pt loading on the membrane on the anode face was 0.1 mg Pt/cm$^2$, the Ru loading was about 0.05 mg/cm$^2$. Then the cathode face of the ionomer membrane was catalyzed in the way described in example 1 (Pt loading 0.1 mg/cm$^2$). After drying, the complete membrane was treated in a sulfuric acid bath (0.5 normal, pH=0.3) for 30 min and then washed with water. After that the membrane coated with catalyst was placed between 2 non-catalyzed gas diffusion layers and incorporated into a PEM single cell. The total noble metal loading was 0.2 mg Pt/cm$^2$ and 0.05 mg Ru/cm$^2$. The single cell test produced very good performance values when operating with reformate/air (reformate composition: 60 vol. % hydrogen, 25 vol. % carbon dioxide, 15 vol. % nitrogen, 40 ppm CO, 2% air bleed, pressureless operation; cell voltage: 550 mV with a current density of 500 mA/cm$^2$).

EXAMPLE 3

2.22 g of a solution of bis(ethanolammonium) hexahydroxoplatinate (Pt content 9 wt. %; total chlorine content <100 ppm; from dmc$^2$, Hanau) were added dropwise to 1.5 l of fully deionized water in which 0.2 g of Kelzan (xanthan gum, Lubrizol-Langer, Bremen) had previously been dissolved. Then 1 l of isopropanol was added with stirring and the resulting mixture was heated, wherein it turned black. The solution was held under reflux for one hour at 85° C. and then concentrated by evaporation to a volume of 100 ml. The colloidal solution obtained in this way had a pH value of 5.6 and contained 2 g Pt/l (0.2 wt. % Pt) and 2 g/l (0.2 wt. %) of the stabilizer Kelzan. The ratio of Pt nanoparticles to stabilizer was thus 1:1. The total chlorine content of the solution was less than 30 ppm. The average size of the Pt particles was determined by TEM and was 2.5 nm.

An ionomer membrane was catalyzed in the same way as described in example 1 and a membrane with a total platinum loading of 0.2 mg Pt/cm$^2$ was produced. In a PEM single cell, very good performance values were obtained when operating with hydrogen/air (pressureless operation; cell voltage: 630 mV with a current density of 500 mA/cm$^2$).

EXAMPLE 4

2.2 g of a solution of bis(ethanolammonium) hexahydroxoplatinate (Pt content 9 wt. %; total chlorine content <100 ppm; from dmc$^2$, Hanau) were added dropwise to 1.5 l of fully deionized water in which 0.436 g of gum arabic (Merck, Darmstadt) and 0.137 g of chromium (III) nitrate nonahydrate (total chlorine content <20 ppm, Merck) had previously been dissolved. The solution thus contained 0.2 g Pt (about 1 mmol) and 0.018 g Cr (about 0.3 mmol) to prepare PtCr nanoparticles with a Pt:Cr-atomic ratio of 3:1. Then 1 g of hydrazine hydrate (24% strength solution, Merck) was added dropwise with stirring and the resulting mixture was heated, wherein it turned black. The solution was held at boiling point for one hour and then concentrated by evaporation to a volume of 100 ml. The colloidal solution obtained in this way contained 2.18 g PtCr (3:1)/l and 4.36 g/l of the stabilizer gum arabic. The ratio of PtCr nanoparticles to stabilizer was thus 1:2. The total chlorine content of the solution was less than 30 ppm. The average size of the PtCr particles was determined by TEM and was about 3 nm.

An ionomer membrane was catalyzed in the way described in example 1. However, the cathode face of the membrane was coated with PtCr (3:1) nanoparticles and the anode face was coated with pure Pt nanoparticles. The membrane coated in this way had a total platinum loading of 0.2 mg Pt/cm$^2$. Measurement in a PEM single cell when operating with hydrogen/air (pressureless operation, about 1 bar) provided very good results. The cell voltage was 720 mV with a current density of 500 mA/cm$^2$.

EXAMPLE 5

Pt nanoparticles were prepared in the way described in example 1. To catalyse an ionomer membrane, the Pt nanoparticles were incorporated into a catalyst ink of the following composition:

| | |
|---|---|
| 15.0 g | Pt supported catalyst (40 wt. % Pt on carbon black) |
| 50.0 g | Nafion solution (10% in water) |
| 30.0 g | Pt nanoparticles (Pt content 1 wt. %) |
| 5.0 g | Dipropylene glycol |
| 100.0 g | |

The above catalyst ink contains a mixture of a conventional Pt supported catalyst and unsupported noble metal nanoparticles according to the invention.

The ink was applied in a screen printing process to the anode and cathode faces of an ionomer membrane (Nafion 112) to give a membrane electrode structure as shown in FIG. 3. The total Pt loading was 0.5 mg/cm$^2$. Measurement in a PEM single cell operating with hydrogen/air (pressureless operation, about 1 bar) provided very good results. The cell voltage was 710 mV with a current density of 500 mA/cm$^2$.

Further variations and modifications of the present invention will be apparent to those skilled in the art from the foregoing and are intended to be encompassed by the claims appended hereto.

German priority application 100 37 071.3 of Jul. 29, 2000 is relied on and incorporated herein by reference.

The invention claimed is:

1. A process for the preparation of carbon-black supported electrocatalysts, which comprises the steps of:
   a) preparing an aqueous solution comprising noble metal nanoparticles embedded in an aqueous solution of a temporary stabilizer which is a polysaccharide,
   b) depositing said aqueous noble metal solution onto a carbon-black support material, and
   c) removing the temporary stabilizer.

2. The process according to claim 1, wherein the temporary stabilizer is removed by thermal decomposition at temperatures up to 250° C.

3. The process according to claim 1, wherein the temporary stabilizer is removed by acidic or alkaline hydrolysis.

4. The process according to claim 1, wherein the aqueous solution of noble metal particles is deposited onto the carbon black support material by impregnation, soaking or incipient wetness methods.

5. The process according to claim 1, wherein the noble metal nanoparticles contain at least one noble metal selected from the group consisting of platinum, palladium, rhodium, iridium, ruthenium, osmium, gold, silver, and mixtures and combinations thereof.

6. The process according to claim 1, wherein the noble metal nanoparticles contain in addition to the noble metal at least one base metal selected from the group consisting of iron, cobalt, nickel, copper, titanium, vanadium, chromium, manganese, molybdenum, tungsten and rhenium.

7. The process according to claim 1, wherein the temporary stabilizer is a heteropolysaccharide selected from the group consisting of gum arabic, xanthan gum, tragacanth gum and mixtures thereof.

8. Carbon-black supported electrocatalysts obtainable by the process according to claim 1, having a noble metal loading of up to 80 wt.-% on carbon black and a medium particle size in the range of 2 to 5 nm.

* * * * *